Sept. 8, 1970  M. EISENBERG  3,527,612
ELECTROCHEMICAL CELL INCLUDING ELECTRODES PROVIDED WITH
ELONGATED RECESSES THEREIN
Filed May 4, 1967
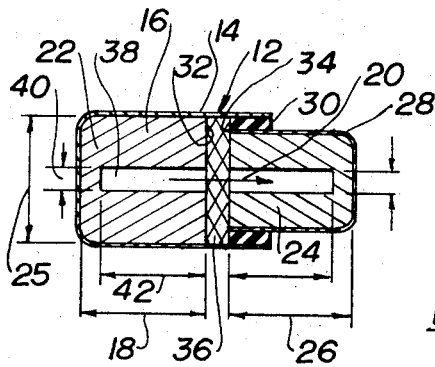
FIG. 1
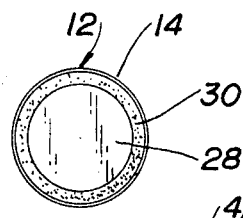
FIG. 1A
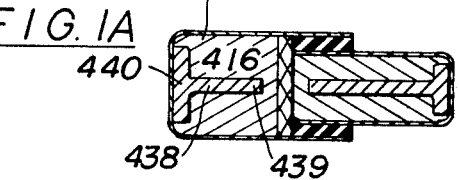
FIG. 5
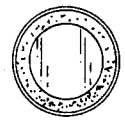
FIG. 5A
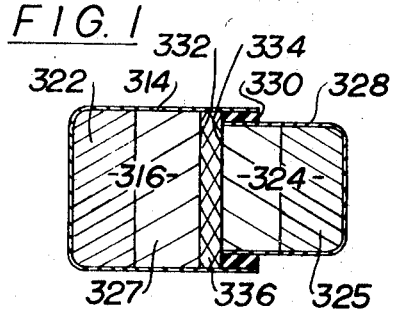
FIG. 4
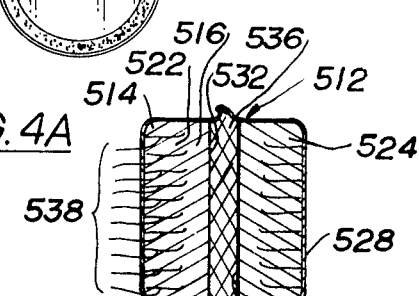
FIG. 4A
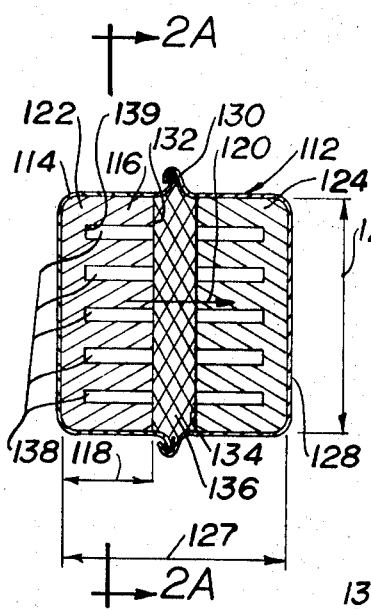
FIG. 2
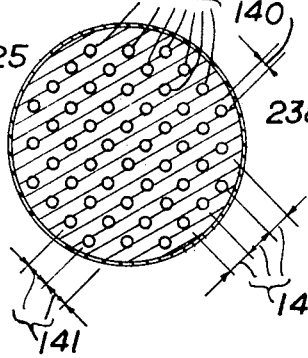
FIG. 2A
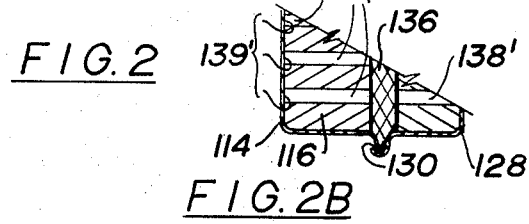
FIG. 2B
FIG. 3
INVENTOR.
MORRIS EISENBERG
BY Warren, Milmore,
Cypher, Rubin & Brucker
ATTORNEYS United States Patent Office 3,527,612
Patented Sept. 8, 1970

3,527,612
ELECTROCHEMICAL CELL INCLUDING ELECTRODES PROVIDED WITH ELONGATED RECESSES THEREIN
Morris Eisenberg, Palo Alto, Calif., assignor to Electrochimica Corporation, a corporation of California
Filed May 4, 1967, Ser. No. 636,129
Int. Cl. H01m 21/00, 35/00
U.S. Cl. 136—6                                                16 Claims

ABSTRACT OF THE DISCLOSURE

An improved electrochemical cell including electrodes having a relatively longer dimension in the direction of current flow through the cell, i.e. thick electrodes, which are provided with elongate recesses therethrough to carry electrolyte to the interior portions of such thick electrodes and hence improve current distribution therethrough and hence the electrochemical efficiency of the cell.

---

Electrochemical cells are sometimes required having a relatively elongate configuration wherein one or both of the electrodes may be described as relatively thick electrodes. More specifically, the length dimension of the electrode is relatively long in the direction generally of current flow through the cell. Typical examples are elongate cylindrical cells and relatively thick button-type cells.

Generally the above described cells present problems which heretofore have not been entirely successfully resolved by the prior art with which I am familiar. Basically, the problem is that as discharge proceeds with time, the active materials within the electrode, particularly the cathode electrode, are consumed at the surface nearest the electrode of opposite polarity; and current has to penetrate the porous structure of the electrode deeper and deeper to maintain the electrochemical reaction supplying power. At the same time, there is usually also a buildup of reaction products within the electrode which tend to gradually block the passage of the current; and, with time, this buildup of reaction products may result in an increase of the internal cell impedance as well as an increased electrode polarization due to the need for ions to diffuse further and further into the porous mass to support the electrochemical reaction. Related to this is the fact that, during discharge, the cathode electrode which may be a metallic oxide, is a relatively poor conductor; and the anode, usually a metal, becomes a metal oxide as discharge proceeds resulting in a relatively poor conductor toward the end of the discharge cycle and during the charge cycle of the cell, if the cell is of a rechargeable type.

Thus, it is an object of this invention to provide an electrochemical cell having at least one relatively thick electrode wherein the electrochemical reaction for operation of the cell may proceed through a relatively deep penetration thereof.

It is also an object of this invention to provide an electrochemical cell wherein the active electrode mass is sufficient to sustain a predetermined amount of electrochemical activity and where such activity penetrates relatively completely through the electrode.

It is a further object of this invention to provide an electrochemical cell including at least one relatively thick electrode comprising an active electrode material having a relatively low electronic conductivity and wherein the conductivity therethrough is maintained at a relatively high level, particularly at the interior portions of such electrode.

Other objects, features and advantages of this invention will become apparent to one of ordinary skill in the art from a reading of the specification which follows and with reference to the accompanying drawings wherein similar characters of reference in each of the several figures refers to the same or corresponding parts.

Turning now to the drawings, FIG. 1 is a sectional view of an electrochemical cell employing one embodiment of my invention;

FIG. 1A is an end view of the electrochemical cell shown in FIG. 1;

FIG. 2 is a sectional view through an electrochemical cell of the so-called button type and employing a variation of the embodiment of my invention as shown in FIG. 1;

FIG. 2A is a sectional view through the electrochemical cell along line 2A—2A of FIG. 2;

FIG. 2B is a variation of the embodiment of my invention shown in FIGS. 2, 2A;

FIG. 3 is another variation of the embodiment of my invention;

FIG. 4 is a sectional view of a cell similar to that shown in FIG. 1 exemplifying another embodiment of my invention;

FIG. 4A is an end view of the cell shown in FIG. 4;

FIG. 5 is a sectional view of an electrochemical cell showing still a further embodiment of my invention;

FIG. 5A is an end view of the electrochemical cell shown in FIG. 5;

FIG. 6 is a sectional view of an electrochemical cell of the so-called button type exemplifying a variation of the embodiment of my invention shown in FIG. 5.

In conventional electrochemical cells, for example silver-zinc, silver-cadmium, or mercury-cadmium batteries, the cross sectional area available for current flow between the cathode and the anode electrodes is ordinarily relatively large compared to the electrode thickness, i.e. the dimension of the electrode taken in the direction of current flow through the cell. Typically, electrodes having thicknesses of .030 inch to .060 inch are employed in cells where the cross sectional area is of the order of 1 to 10 or more square inches. Even in small button type cells, electrode thicknesses, generally no greater than about 0.150 inch, may be used compared to an area for current flow of the order of ½ to 1 square inch.

In certain applications, electrochemical cells capable of maintaining a predetermined amount of energy output are required; and such requirement necessitates an appreciable amount of active electrode material. If the cross sectional area available to accommodate such cell is limited, then the electrode may require to be of the aforementioned thick construction. An example of such a cell is illustrated in FIGS. 1 and 1A, FIG. 1 being a lateral cross section thereof to reveal certain details of my invention. Such a cell 12 includes cathode enclosure 14 which houses active cathode material 16 and may, for example, consist of a relatively porous mass of a metal oxide, such as mercuric oxide, having a relatively long dimension 18 in the direction 20 of current flow through the cell. Such an electrode, due to its relatively long dimension in the direction of current flow, is herein referred to as a thick electrode and includes an interior portion 22 remotely located from the other electrode or anode 24 which, for purposes of illustration, may comprise a porous mass of cadmium metal, also having a relatively long dimension 26 in the direction generally of the current flow line 20. As in the case of the cathode, anode 24 is housed in a suitable anode enclosure 28 adapted for secure engagement within one end of cathode enclosure 14, the two enclosures being insulated from each other by means of annular insulating gasket 30 which may be fabricated of rubber, neoprene, or other suitable material. Confronting faces or front surfaces 32, 34 of the cathode and anode, respectively, have interposed between them a suitable porous separator 36 which also carries an amount of appropriate electrolyte, such as a solution of KOH in the alkaline mercuric oxide-cadmium cell being described here; and such electrolyte is present throughout most of the cell by virtue of the porosity of electrodes 16 and 24 and certain features of my invention to be described.

During the discharge period of cell operation, the active materials proximate electrode faces 32, 34 are consumed; and thereafter current has to penetrate the porous structure of the electrodes deeper and deeper to maintain the electrochemical reactions supplying the power. At the same time, there is a buildup of reaction products which may tend to gradually block the passage of current. With time, such buildup of reaction products usually results in an increase of internal cell impedance and increased electrode polarization due to the need for ions to diffuse further and further into the porous mass to support the electrochemical reaction. In conventional cells having electrodes of a particularly thick construction, such reaction should proceed toward and occur within the interior thereof if such reaction is to be sustained; and this is relatively difficult if not impossible for the reasons just mentioned.

An important feature of my invention is that relatively large amounts of electrolyte are carried into the interior portion of a thick electrode sufficient to support a substantially complete electrochemical reaction with the electrode material located therein. In the embodiment of my invention shown in FIG. 1, this feature is achieved by means of cylindrical cavity 38 formed within cathode 16, such cavity having diameter 40 and length dimension 42, which is at least twice the diameter of the cavity and preferably greater than half the thickness dimension 18. Such cylindrical cavity is filled with and carries electrolyte to provide for improved current distribution and penetration within the interior portion 22 of the electrode. In an alternative variation not shown, the cylindrical cavity may be extended through the entire electrode; should extend to the interior portion of the electrode. The total mass of electrode material is selected so that after formation of cavity 38 the amount of active electrode material remaining is sufficient to support a substantially complete electrochemical reaction in accordance with the energy requirement required of the cell through its discharge cycle.

As can be seen by reference to FIG. 1, a cylindrical cavity is provided at both the cathode and anode of the cell. However, it is understood the cell may be provided with only one electrode embodying such cylindrical cavities.

The embodiment of my invention described above may also be applied to cells of a somewhat different construction than the elongate cylindrical cell 12 shown in FIG. 1. More specifically, the invention may also be applied to cells known as button-type cells exemplified in FIGS. 2, 2A. A typical button-type cell derives its name from its generally flat cylindrical configuration. Such a cell 112 is shown having diameter 125 and housing therein electrodes 116, 124. Diameter 125 is substantially larger than the overall length 127, and hence the flat appearance; even though depth dimension 118 of cathode 116 in the direction generally of current flow through the cell indicated by arrow 120 is relatively long. Porous cathode electrode 116 is embedded in a suitable enclosure or housing 114, and anode 124 is encased in housing 128. Interposed between cathode front surface 132 and anode front surface 134 is micro-porous separator 136 wetted with a suitable electrolyte. Cathode housing 114 is formed with a flared circumferential lip about which an overlapping portion of anode can 128 is secured as by crimping with insulating gasket 130 disposed therebetween to prevent electrical contact between the anode and cathode housings. The other details of the example shown in FIGS. 2, 2A, for example the composition of the active electrode materials and the electrolyte utilized in the cell, are similar to those described in respect to FIGS. 1, 1A above. In the embodiment of FIGS. 2, 2A, I achieve the desirable results of my invention by means of a plurality of holes or cylindrical cavities 138 in electrode 116, each of such cavities forming an opening at surface 132 confronting anode surface 134 and having a terminus 139 proximate interior portion 122 of the thick cathode electrode 116.

The array of the aforementioned cavities 138 may be seen in the sectional view of FIG. 2A where, for sake of clarity, only several of such cylindrical cavities are identified by reference numerals. It is understood, of course, that the diameter of each of the cavities may vary, although I prefer to make them all of the same diameter. As noted in respect to the description of the embodiment of FIG. 1, 1A, the relationship between the depth and the diameter of the cavities is maintained so that the latter penetrate to the region of the electrode proximate the interior portion thereby to carry the required amount of electrolyte into contact with electrode material of sufficient mass to support the desired degree of electro-chemical activity for the particular operation that the cell is designed. In the embodiment which I show in FIGS. 2, 2A, the longitudinal axis of the cylindrical cavities are maintained substantially parallel to the line of direction of current flow 120 through the cell and are spaced apart from each other at uniform intervals not less than about ½ nor greater than about 5 times the diameter of one of said cylindrical cavities.

Another variation on the foregoing embodiment is shown in FIG. 2B which shows a detail of the lower left-hand portion of the section shown in FIG. 2. In this embodiment, I extend cylindrical cavities 138 entirely through electrode 116 to form through cavities 138' which in turn form a second opening 139' at the surface of the thick electrode furthest from the electrode of opposite polarity adjacent thereto in the same cell.

Still a further embodiment of my invention is shown in the partial sectional view of FIG. 3. In this embodiment a plurality of electrodes of opposing polarity are interposed between one another in alternate arrangement, such as cathodes 216 in alternate interposition with anode 224. Each of the pairs of confronting electrode surfaces 232, 234 have interposed therebetween typical electrolyte bearing separator 236; and the entire cell is housed in a suitable non-conductive container 214. Additional details, such as composition of cell electrodes, electrolyte, and the like, are substantially similar to that as described hereinabove in respect to FIGS. 1, 1A. To achieve the benefits of my invention with electrodes of the type of cell described here, cylindrical cavities 238 are formed within the cathode electrodes and extend from each face 232 penetrating therethrough to internal portion 222 located about the mid-transverse section thereof. When also formed in the anode, such cylindrical cavities 239 define termini 239a relatively near termini 239b of the other set of cavities formed in the same electrode from the opposite side.

Still another embodiment of my invention, using an alternative structure for cavities to carry relatively large amounts of electrolyte to the interior portions of relatively thick electrodes, is exemplified in the embodiment shown in FIGS. 4, 4A. There I again show a cylindrical cell having a construction similar to the type illustrated in FIGS. 1, 1A. Cathode housing 314 surrounds and engages a portion of anode housing 328, the two being electrically insulated from each other by means of circumferential gasket 330. Internally, porous separator 336 interposes between confronting electrode surfaces 332, 334 and separates cathode electrode 316 from anode electrode 324. The type of electrode material and electrolyte utilized here may be the same as that described in respect to FIG. 1. In this embodiment of my invention, however, an alternative construction is utilized to carry electrolyte solution to interior portion 322 of the cathode, and/or 325 of the anode, if so desired. More particularly, thick electrode 316 is fabricated to form at least two contiguous portions 327 and 322 in axial alignment with each other and having interior portion 322 remote from anode 324; and an anterior portion 327 having surface 322 in confronting relationship to the anode. Each contiguous portion 322, 327 comprises a differently porous electrode material with the volume percent porosity of portion 327 being relatively high and substantially greater than the volume porosity of interior portion 322. The voids established by the high volume percent porosity of anterior portion 327 permits a relatively large amount of cell electrolyte to be carried therethrough into contact with interior portion 322. In this manner, the electrolyte within the cell, in part held by porous separator 336 and in part located within electrodes, is permitted to penetrate in relatively large amounts into reactive contact with contiguous interior portion 322, thereby to provide deep penetration within the thick electrode 316 of the electrochemical reaction between the electrolyte and active electrode material.

As an example of the foregoing, I have fabricated a cell utilizing a mercuric oxide cathode fabricated to include an anterior portion having a depth dimension in the direction of current flow through the cell of about half the total depth of the electrode with a volume percent porosity of about 40 percent and an interior portion of a volume porosity of about 20 to 25 percent. Such embodiment of my invention generally improves the electrochemical performance of the cell compared to that utilizing a conventional mercuric oxide electrode having a uniform volume percent porosity therethrough of about 30 percent. At the same time, the electrode embodying my invention may be fabricated to contain at least an equal amount of active cathode electrode material. Thus, in a cell having a predetermined amount of electrode material sufficient to support a predetermined quantum of electrochemical activity, the application of my invention permits a generally greater utilization of the electrode materials therethrough when the configuration of the electrode is such that the length dimension thereof in the direction generally of current flow through the cell is relatively great, i.e. the electrode is thick.

It should be understood here, as in the other embodiments of my invention, that the anode electrode of the aforedescribed cell may also be fabricated utilizing the above-described structure. For example, in a mercuric oxide-cadmium cell, the cadmium anode, instead of an average uniform porosity of 55 percent, may have an anterior portion, equal to about half the total electrode volume, with a volume percent porosity of 70 percent and an interior portion with a volume porosity of about 40 percent.

A further example of the foregoing embodiment of my invention may comprise three or more, i.e., a plurality, of contiguous portions comprising, for example, anode 316 wherein each of the contiguous portions is made of a differently porous electrode material. Such portions are selected with the volume percent of porosity of each successive contiguous portion being greater than that of preceding portion with the one having the highest volume percent of porosity being the anterior portion. The entire thick electrode may be fabricated utilizing a total predetermined amount of electrode material sufficient to support a predetermined quantum of electrochemical activity. That is the voids established by the higher volume percent of porosity of these successive contiguous portions permits a relatively large amount of electrolyte of the cell to be carried therethrough. In this way, cell electrolyte may penetrate into reactive contact with the contiguous portions of the electrode including the interior portions thereof to provide deep penetration within said thick electrode of the electrochemical reaction between the electrolyte and electrode material.

In some cases, it may be desirable to employ a combination of the foregoing embodiments of my invention, i.e. to provide a cylindrical cavity or cavities in at least one of the electrodes as described in greater detail hereinabove in respect to FIGS. 1, 1A, 2, 2A, 2B and 3, with the aforementioned embodiment described in respect to FIGS. 4 and 4A. More specifically, in the cell described in respect to FIGS. 4, 4A, at least one of the electrodes therein may be provided with one or more cylindrical cavities formed therein having a diameter substantially less than the length thereof with each of the cavities forming an opening at the surface of the electrode confronting the other or opposite polarity electrode. The terminus of such cylindrical cavity should be located proximate the interior portion of the thick electrode; or, as described in respect to FIG. 2B above, the cavity may penetrate entirely through the electrode.

As is evident from the foregoing, my invention broadly embraces structure within the electrochemical cell to enhance electrochemical activity therethrough and in particular the development of current flow within the active electrode which has a relatively long dimension in the direction generally parallel to the direction of current flow through the cell. With this in view, I now explain still another embodiment of my invention referring again to FIGS. 4, 4A but omitting any reference thereto to electrode portions of different volume percent porosity.

As is generally known, cathode electrodes such as electrode 316 comprising, for example, mercuric oxide, has a relatively low electronic conductivity. Such low conductivity decreases the amount of current flow through the electrode, particularly interior portion 322, during operation of the cell. In accordance with the prior art with which I am familiar, a small percentage of conductive material, such as graphite, carbon, or other suitable metallic powders, are added to the electrode material mix to provide better conductivity. The amount of such conductive materials added are usually in a range from about 2 to 25 percent, by weight, of the total electrode; but a relatively large amount of conductive material, which could greatly improve the electronic conductivity of the electrode itself, is generally undesirable because it displaces active electrode material needed to provide a desired total amount of energy to be supplied. Too little conductive material, of course, results in undesirably large internal ohmic losses. To overcome this problem in accordance with my invention, I provide an electrode such as 316, hereafter referred to as electrode 316', the prime (') notation distinguishing this embodiment of my invention, having predetermined amounts of relatively small particles of conductive material carried interiorly of the electrode, with the weight percentage thereof in respect to the mass of the entire electrode at interior portion 322' being relatively greater than the weight percent of such particles at the anterior portion 327'. I have found it satisfactory to utilize conductive materials such as graphite, carbon, or metallic powders, or mixtures thereof, selected from among those which are relatively chemically inert to the particular electrolyte of the cell and material of the electrode within which the material is added. Also, I have found it satisfactory to provide such particles of conductive material in amounts wherein the weight percentage of the particles at the interior portion of the electrode is in the range of about 1.5 to 3 times the weight percentage thereof at the anterior portion. More specifically, for a mercuric oxide cathode, I have found it satisfactory to provide the interior portion thereof with 6 percent carbon black and 20 percent of silver powder; and the anterior portion with 3 percent carbon black and 8 percent silver powder. Similar particulate matter may be added to the anode even though the anode may initially comprise a relatively conductive material such as cadmium metal. However, as the cell discharges, a metal such as cadmium becomes cadmium oxide, a relatively poor conductor; and the presence then of the conductive material within the electrode tends to maintain its former relatively higher conductivity. With reference to the foregoing example, it is apparent that an electrode may comprise more than two layers having a distinct and different composition of conductive material, wherein each successive layer contains a higher percentage of conductive material with the interior portion of the electrode having the highest percentage thereof, and the anterior portion having the lowest percentage.

I have also found it advantageous to utilize the embodiment of my invention employing contiguous electrode layers having graduated amounts of conductive material with the embodiment employing layers having different porosity; and, in some instances, I have found it desirable to combine the embodiments of my invention as explained in respect to FIGS. 1, 1A 2, 2A, 2B, 3, 4, and 4A with that of the last embodiment described above. More particularly, I have found it advantageous to provide, an electrode having contiguous layers utilizing different volume percentage porosities increasing toward the anterior portion of the electrode; each such contiguous portion having varying amounts of conductive material added, with the greatest amount being at the interior portion and the least amount being at the anterior portions; and providing cylindrical cavities through the electrode from the surface thereof nearest the electrode of opposite polarity and terminating proximate the interior portion of the electrode.

A further embodiment of my invention is exemplified in FIGS. 5, 5A wherein I show a cell similar to that shown in FIGS. 1, 1A with the exception of deletions or elements I now describe in respect to the description of FIGS. 5, 5A. Electrode 416 is a cathode of relatively uniform porous material, but instead of being provided with a cylindrical cavity therethrough, I provide elongate stem 438 having a base 440 and a tip 439 at the opposite end thereof. I secure the base in conductive contact with the inside surface of the conductive cathode container furthest away from the electrode of opposite polarity. Tip 439 is located proximate the anterior surface of the thick cathode electrode. The entire stem is fabricated of a relatively conductive material substantially inert to the electrolyte, electrode material, and conductive material of the outside container. In this way, I achieve relatively high electronic conductivity through the thick electrode which may contain an active electrode material such as mercuric oxide having relatively poor conductivity. In this way, the current flow through the cell and its electrochemical activity, particularly at interior portion 422, is substantially increased. The specific material used for the entire stem may be selected from the same group of materials described hereinabove in respect to the particulate conductive material added to electrode 316', i.e. carbon, graphite or a suitable metallic material.

Still another embodiment of my invention is shown in FIG. 6. The cell there is of the button type as generally described in respect to FIGS. 2, 2A; and the elements in common are not further described herein but shall bear corresponding numerals differing only in the hundreds digits, those of FIGS. 2, 2A being in the one hundred series and those of FIG. 6 being in the 500 series. In this embodiment, instead of utilizing a conductive element such as stems 438 shown in FIG. 5, I provide a plurality of relatively small diameter filaments 438 each having a base at one end conductively secured to the inside surface of the container housing the electrode in which such filaments are embedded, such surface being remote from the opposite polarity electrode. The tip end of each of the filaments is located proximate the anterior portion of the thick electrode in which the filaments are embedded. Such filaments are fabricated of a relatively highly conductive material, similar to that of the stem material described in respect to FIG. 5. Thus, I achieve the advantages of my invention as explained above in respect to the stems 438 indicated at FIG. 5, utilizing in lieu therefor conductive filaments 538 which, because of the distribution of conductive material formed thereby, may provide a more even distribution of current flow than that shown in the embodiment of FIG. 5.

Again it is understood that, without showing a separate figure in the drawings, it may be desirable to combine the last two described embodiments of my invention with certain of the earlier. For example, I have described above a cell utilizing an electrode having at least one electrode comprising portions thereof with varying degrees of volume percent porosity; conductive particulate matter distributed in varying percentages throughout contiguous portions of the electrode; and cylindrical cavities formed therethrough. In addition, it may be desirable to provide such electrode with conductive means such as stem 438 or filaments 538 secured to the inner surface of the electrode housing and extending therethrough to a point proximate the anterior portion of such electrode.

A number of further variations of my invention should be apparent to one of ordinary skill in the art after familiarizing himself with the foregoing specification and the accompanying drawing, wherein corresponding characters of reference refer to the same or similar elements in each of the separate figures. However, it is contemplated that such variations, based upon the foregoing specification which set forth my invention in some detail for purposes of illustration and not of limitation, may fall within the spirit thereof and scope of the appended claims.

I claim:

1. In an electrochemical cell, the combination comprising:
    a pair of electrodes of opposite polarity including at least one thick electrode having a relatively long dimension in the direction generally of current flow through said cell, said thick electrode including an interior portion remote from the other of said electrodes and having a sufficient mass of electrode material to sustain a predetermined amount of electrochemical activity;
    an electrolyte within said cell in contact with said electrodes; and
    an electrolyte receiving recess formed in said thick electrode, said recess forming an opening at the surface of said thick electrode confronting the other of said electrodes and a terminus proximate the interior portion of said thick electrode to provide a passage therethrough to carry amounts of said electrolyte into contact with the interior portion of the thick electrode sufficient to support complete electrochemical reaction with the electrode material located therein, whereby said cell operation includes a relatively deep penetration of the electrochemical reaction between said electrolyte and said thick electrode having sufficient mass to sustain a predetermined amount of electrochemical activity.

2. The electrochemical cell in accordance with claim 1 wherein said recess comprises a cylindrical cavity having a diameter substantially less than the length thereof.

3. The electrochemical cell in accordance with claim 1 wherein the terminus of said recess forms a second opening at the surface of said thick electrode remote from said other electrode.

4. The electrochemical cell in accordance with claim 1 wherein said recess includes a plurality of cylindrical cavities each having a diameter substantially less than the length thereof, said cavities each forming an opening at the surface of said thick electrode confronting the other of said electrodes and a terminus proximate the interior portion of said thick electrode.

5. The electrochemical cell in accordance with claim 4 wherein said cylindrical cavities are substantially parallel to each other and spaced apart from each other at uniform intervals not less than about 1.5 nor greater than about 5 times the diameter of one of said cylindrical cavities.

6. In an electrochemical cell, the combination comprising:
    a housing;
    a pair of electrodes of opposite polarity carried within said housing including at least one thick electrode having a relatively long dimension in the direction generally of current flow through said cell, a plurality of elongate contiguous portions of said thick electrode located therein in axial alignment with each other including an interior portion remote from the other of said electrodes and an anterior portion having a surface thereof in confronting relationship to the other of the electrodes, each of said contiguous portions comprising a differently porous electrode material wherein the volume percent of porosity of each of said successive contiguous portions is greater than the preceding portion with the highest volume percent of porosity being that of said anterior portion, said thick electrode being fabricated with a total predetermined amount of electrode material sufficient to support a predetermined quantum of electrochemical activity and wherein the voids established by the higher volume percent of porosity of the anterior portion permits a relatively large amount of the below mentioned electrolyte to be carried therethrough; and an electrolyte within said cell in contact with said electrodes, whereby a relatively large amount of said electrolyte is permitted to penetrate into reactive contact with said contiguous portions including said interior portion and provide deep penetration within said thick electrode of the electrochemical reaction between the electrolyte and electrode material.

7. The electrochemical cell in accordance with claim 6 and at least one cylindrical cavity formed in said thick electrode having a diameter substantially less than the length thereof, said cavity forming an opening at the surface of said thick electrode confronting the other of said electrodes and a terminus proximate the interior portion of said thick electrode.

8. The electrochemical cell in accordance with claim 6 and particles of conductive material in predetermined amount carried by said thick electrode with the weight percentage thereof in respect to the total of said thick electrode at the interior portion being relatively greater than the weight percentage at the anterior portion.

9. The electrochemical cell in accordance with claim 7 and particles of conductive material in predetermined amount carried by said thick electrode with the weight percentage thereof in respect to the total of said thick electrode at the interior portion being relatively greater than the weight percentage at the anterior portion.

10. The electrochemical cell in accordance with claim 9 wherein further:

said housing comprises;

a first container fabricated of a conductive material substantially chemically inert to said electrolyte and said thick electrode material, said thick electrode being carried by said first container;

a second container fabricated of conductive material substantially chemically inert to said electrolyte and said other of the electrodes, said other electrode being carried by said second container, said first and second containers secured to each other with said electrodes in confronting relationship; and insulation means formed of a non-conductive material substantially chemically inert to said containers, electrodes and electrolyte mounted between said first and second containers for electrically insulating the containers from each other; and means having a relatively high electronic conductivity carried interiorly of said thick electrode and in conductive contact with the inner surface of said first container remote from the other of said electrodes, said means being formed to provide a path for current flow through the interior portion of said thick electrode and fabricated of a material that is relatively inert to said electrolyte and thick electrode material, said thick electrode having a mass of electrode material sufficient to support a predetermined amount of electrochemical activity between said electrolyte and electrode material for operation of said cell.

11. In an electrochemical cell, the combination comprising:

a housing;

a pair of electrodes of opposite polarity carried by said housing including at least one thick electrode fabricated of an electrode material having a relatively low electronic conductivity and a relatively long dimension in the direction generally of current flow through said cell, said thick electrode including an interior portion remote from the other of said electrodes and an anterior portion with the surface of the thick electrode facing the other of the electrodes;

an electrolyte within said cell in contact with said electrodes;

conduction means carried interiorly of said thick electrode having a relatively high electronic conductivity to provide a path for current flow through the interior portion of said thick electrode, said means being relatively inert to said electrolyte and the electrode material of said thick electrode and selected so that the amount of electrode material surrounding said means and forming said thick electrode is sufficient to support a predetermined amount of electrochemical activity between said electrolyte and the electrode material for operation of said cell, whereby the current flow through said thick electrode is maintained at a relatively uniform value throughout thereby increasing the electronic conductivity and minimizing the internal impedance of said cell.

12. The electrochemical cell in accordance with claim 11 wherein said means comprises relatively small particles of conductive material carried interiorly of said thick electrode in predetermined amounts with the weight percentage thereof in respect to the mass of the entire electrode at the interior portion being relatively greater than the volume percentage at the anterior portion.

13. The electrochemical cell in accordance with claim 12 and at least one cylindrical cavity formed in said thick electrode having a diameter substantially less than the length thereof, said cavity forming an opening at the surface of said thick electrode confronting the other of said electrodes and a terminus proximate the interior portion of said thick electrode.

14. The electrochemical cell in accordance with claim 12 wherein the weight percentage of said particles at the interior portion is in the range of about 1.5 to 3 times the weight percentage thereof at said anterior portion.

15. The electrochemical cell in accordance with claim 11 wherein further:

said housing comprises a first container fabricated of a conductive material substantially chemically inert to said electrolyte and said thick electrode material, said thick electrode being carried by said first container;

a second container similar to said first container and relatively chemically inert to said other of the electrodes, said other electrode being carried by said second container, said first and second containers secured to each other with said electrodes in confronting relationship; and insulation means formed of a non-conductive material that is substantially chemically inert to said containers, electrodes and electrolyte disposed between said first and second containers for electrically insulating the containers from each other; and wherein said conduction means comprises an elongate stem having a base at one end and a tip at the other, said base being secured in electroconductive contact with the inside surface of said first container remote from the other of said electrodes with said tip located proximate the anterior surface of said thick electrode, said stem being fabricated of a relatively conductive material substantially inert to said containers.

16. The electrochemical cell in accordance with claim 11 and wherein further:

said housing comprises
a first container fabricated of a conductive material substantially chemically inert to said electrolyte and said thick electrode material, said thick electrode being carried by said first container;
a second container similar to said first container and relatively chemically inert to said other of the electrodes, said other electrode being carried by said second container, said first and second containers secured to each other with said electrodes in confronting relationship;
insulation means formed of a non-conductive material that is substantially chemically inert to said containers, electrodes and electrolyte disposed between said first and second containers for electrically insulating the containers from each other; and
wherein said conduction means comprises a plurality of relatively small diameter filaments each having a base at one end and a tip at the other end, each said base being secured in electroconductive contact with the inside surface of said first container remote from the other of said electrodes with said tip located proximate the anterior portion of said thick electrode, said filaments being fabricated of a relatively conductive material substantially inert to said containers.

References Cited

UNITED STATES PATENTS

| | | | |
|---|---|---|---|
| 2,462,998 | 3/1949 | Ruben | 136—107 |
| 3,108,908 | 10/1963 | Krebs | 136—6 |
| 3,310,436 | 3/1967 | Ralston et al. | 136—6 |

WINSTON A. DOUGLAS, Primary Examiner

A. SKAPARS, Assistant Examiner

U.S. Cl. X.R.

136—111